United States Patent [19]

Pirovano

[11] 4,131,402
[45] Dec. 26, 1978

[54] DEVICE FOR THE MUTUAL CENTERING OF RELATIVELY MOVABLE MECHANIC ELEMENTS, PARTICULARLY USED ON TIRE CURING PRESSES

[75] Inventor: Dante Pirovano, Milan, Italy

[73] Assignee: Industrie Pirelli S.p.A., Milan, Italy

[21] Appl. No.: 849,215

[22] Filed: Nov. 7, 1977

[30] Foreign Application Priority Data

Nov. 15, 1976 [IT] Italy .................. 29324 A/76

[51] Int. Cl.² .............................. B29H 5/08
[52] U.S. Cl. .......................... 425/38; 425/19
[58] Field of Search ............... 425/38, 22, 23, 24, 425/25, 26, 19

[56] References Cited

U.S. PATENT DOCUMENTS

| | | | |
|---|---|---|---|
| 3,015,130 | 1/1962 | Voth | 425/22 |
| 3,074,109 | 1/1963 | Duerksen | 425/23 |
| 3,137,032 | 6/1964 | MacMillan | 425/19 |
| 3,200,443 | 8/1965 | Maddox et al. | 425/23 X |
| 3,233,284 | 2/1966 | MacMillan | 425/23 X |
| 3,697,206 | 10/1972 | Bonazzi | 425/38 X |
| 4,025,251 | 5/1977 | Cantarutti | 425/38 X |

Primary Examiner—J. Howard Flint, Jr.
Attorney, Agent, or Firm—Stevens, Davis, Miller & Mosher

[57] ABSTRACT

Apparatus for accurately aligning two elements of a press which have relative movement between them is provided in the form of a pair of interconnected levers and a cooperating tooth. The pair of interconnected levers are mounted on one of the two elements with each lever having a tooth engaging face, the pair of tooth engaging faces forming a vise which selectively engages the tooth located on the other element. Accurate alignment between the two elements is achieved by relative movement between the two elements caused by the vise engaging the tooth.

16 Claims, 5 Drawing Figures

DEVICE FOR THE MUTUAL CENTERING OF RELATIVELY MOVABLE MECHANIC ELEMENTS, PARTICULARLY USED ON TIRE CURING PRESSES

This invention relates to a device for the mutual centering of mechanical elements relatively movable with respect to one another. It is used to good advantage on tire curing presses equipped with an apparatus for automatically unloading the cured tire and simultaneously loading a new raw carcass which has to be cured on the press.

As it is well known to every machinery technician, countless situations occur where the running of a machine or of an apparatus requires temporary mutual alignment, according to a common axis, of mechanical elements relatively movable with one another orthogonal to that axis. In this text the above alignment is generally called centering.

One of these centering operations occurs in tire curing presses equipped with a so-called "transfer" mechanism for the automatic loading and unloading of tire carcasses. The technical problem to be solved is that of centering the upper part of the press and of the loading device of raw carcasses which are integral with the transfer mechanism with the lower part of the press. In this apparatus the transfer mechanism only moves crosswise with respect to the lower part of the press. This type of press, which is substantially like all presses, consists of a bed fastened to a support means, such as the ground, on which half of the mold is set up, and a plate, axially movable upward with respect to the bed, on which the other half of the mold is set up. In addition, a frame is provided integral with the bed. The frame is usually higher than the press when the press is in a closed condition. A truck moves horizontally on the frame and contains the operating mechanism of a pliers for seizing a raw carcass to be cured which is stored at one side of the press. The plate and pliers operating mechanisms are fastened, aligned and spaced from each other on the truck in the direction of the above crosswise movement.

The operation of the above described apparatus is also known. After tire curing, an operating cylinder lifts the plate together with the cured tire while the seizing pliers simultaneously lift a new raw carcass to be cured. Following this, the truck moves on the frame to a location at which it sets the pliers on the bed in a position centered with respect to the axis of the lower part of the mold while the plate is located in a position overhanging a conveying device, which moves the cured tire away. While the cured tire is dropped from the plate on the conveying device, the pliers load the new raw carcass into the mold. Following this loading and unloading operation, the truck moves again, but in the opposite direction, setting the plate once again in a position coaxial with the bed and the pliers in corresponding alignment with the new carcass supporting fixture, which is located at one side of the press, on which a new carcass to be cured will be put before starting a new cycle. As is apparent from the above description, the operation of the transfer mechanism provides for two different centering positions, namely, that of the plate with the bed and that of the pliers with the bed or, more precisely, with the bottom portion of the mold.

The first centering position is undoubtedly the most important of the two in the car tire curing field; since even a small misalignment between the two tire beads, which is a consequence of the misalignment between the two halves of the mold, i.e., between bed and plate, seriously damages the quality and performances of the finished tire.

In practice, with the operating devices of the truck used to date, such misalignment could be as small as a centimeter and be excessive considering the standard performance quality required today for tires. Moreover, this misalignment may be of different magnitudes for each closing cycle of the press and is constantly changeable in the long run due to the wear of the mechanical operating and controlling members of the transfer mechanism, resulting in unacceptable non-uniformity in the characteristics of the finished product and the need for careful maintenance of the transfer mechanism.

Accordingly, an object of this invention is to provide a control and stopping device for the truck which is simple and cheap, but at the same time capable of assuring the accurate centering between the movable parts and the fixed parts of the above described vulcanizing unit, and which has a relatively narrow margin of error which remains constant over time.

The structure for carrying out this object is a press apparatus for operating tire curing molds which consists of two apparatus relatively movable orthogonal to a prefixed axis, one of said apparatus consisting of the so-called press, the other of a transfer mechanism, which can be moved relative to the press orthogonal to the axis of the curing mold which is set up on the press forming the above prefixed axis. These two apparatus allow for the simultaneous unloading of the cured tire and the loading of the raw carcass to be cured. The press includes: a bed fastened to the ground on which the lower part of the curing mold is fixed with vertical axis; a plate vertically movable with respect to the bed on which the upper part of the above mold is set up, this vertical movement of the plate with respect to the bed causing the alternate opening and closing of the mold; and, a frame integral with the bed. The aforesaid transfer mechanism includes: a truck movable horizontally on the frame in a prefixed direction; a first mechanism integral with the above truck for the vertical operation of the plate and the upper part of the mold; a second mechanism integral with the above truck in a position aligned with the above first mechanism parallel to the direction of movement of the truck, having mounted thereon for vertical operation the seizing pliers for raw carcasses; and, a means for controlling the movement of the truck on the frame for a first approximate mutual alignment of the transfer mechanism with the press, at least according to a common prefixed axis. Further included along with the press and transfer mechanism is a device for controlling a second precision alignment between the transfer mechanism and the press according to the above common prefixed axis and for locking the transfer mechanism over the press in the above centered position. This device consists of a mechanical fiducial element, hereinafter called "tooth," integral with one of either the press or the transfer mechanism apparatus in a first prefixed position; a vise for seizing the above tooth, integral with the other apparatus in a second prefixed position, the tooth and vise being able to mutually mate when at least approximate alignment exists between the transfer mechanism and the said press, according to the above common prefixed axis, the said tooth and vise, when mutually mated, forming a locking constraint between the transfer mechanism and press. The vise itself comprises: a bearing plate, integral with the transfer mechanism; two levers coplanar to each other in a plane parallel to the lying plate of the bearing plate, each one rotating around a pin which extends out of that plate orthogonally, each lever showing a curvilinear profile and containing a tooth portion in the zone between the pins, the said levers being mutually coupled for rotation about their respective pins by means of their respective teeth, each lever further having a profile on one of its ends which forms one of the jaws of the vise, the ends being arranged on the same side with respect to the plane containing the axes of the above pins, the above mutual rotation of the levers carrying out the opening and closing of the vise, the symmetry plane of the said vise being arranged orthogonal to the plane containing the pin axes and to the lying plane of the said levers; and, means adapted to impart the mutual rotation of the levers between two limit positions, called "open vise" and "closed vise" respectively, corresponding to an interdistance between the jaws of maximum and minimum value respectively, the maximum value being not lower than that corresponding to the position of the levers where the plane tangent to the jaws with a surface parallel to the plane containing the above axes turns out to be also tangent to the tooth surface opposing the plane tangent to the jaws.

In order to provide an efficient running of the device, the minimum value of the distance between the jaws in the limit position of the closed vise is less than the width of the tooth in the direction of the movements of the truck with respect to the frame. In order to take the greatest advantage possible of this arrangement, means are supplied for applying thrusts, during the closing rotation of the vise, on the jaws concordant with the above rotation.

According to a suitable practical embodiment of the invention, the means adapted to impart the mutual rotation of the levers also applies the above concordant thrusts and consist of a double action cylinder attached to the transfer mechanism having a stem connected with one end of one of the levers.

To provide a more even operation, the press comprises two identical positioning devices for the precision alignment between the transfer and the press which are symmetrically arranged with respect to the vertical plane containing the axes of the mold and that of the pliers, the vises being integral with the truck and the tooth being integral with the frame. Furthermore, in order to provide a movement for the truck without rough accelerations and decelerations, as well as to make the action of the vise with the consequent movement of the truck on the frame easier, the means controlling the movements of the truck comprise at least a pair of driving wheels for the truck connected with an operating motor through a brake clutch device adapted to stop the movement of the motor and for disconnecting the motor from the driving wheels. Running is then automatically controlled, since well-known means are supplied, which prevent the vise from closing when the driving wheels are connected with the operating motor.

In addition to providing a precise centering of the upper part of the mold with the lower part of the same, a similar careful centering of the raw carcass to be cured on the lower part of the curing mold may be obtained. To achieve this latter centering, the press is equipped with two common prefixed aligning axes between transfer and press, formed respectively by the coaxial alignment of the upper part of the mold and the carcass seizing pliers with the lower part of the mold. For each axis the frame is equipped with a special connection tooth for interaction with the vise.

This invention will be better understood when the following description is read in conjunction with the enclosed figures, which are merely exemplary of the invention and not to be taken as limiting the same and refer to the particular use of the invention in the field of curing tires.

In particular:

Figure 1:
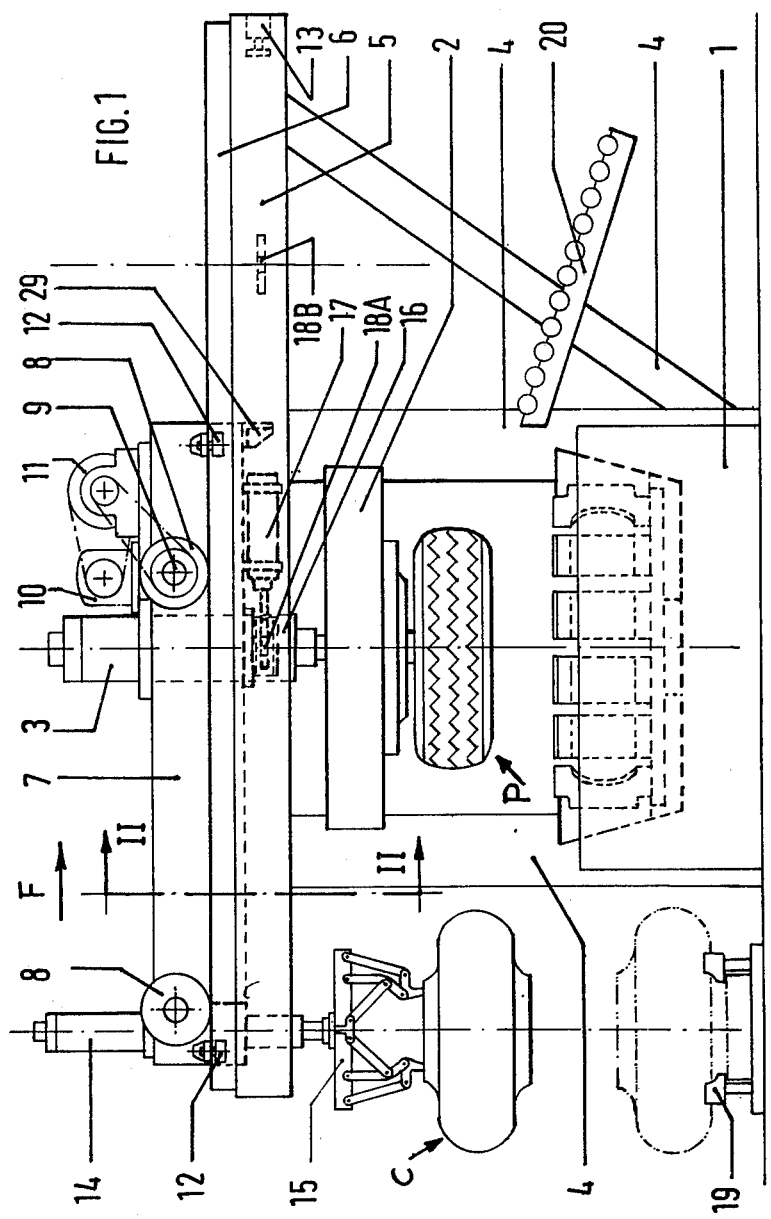
FIG. 1 illustrates, in side view, a press with transfer mechanism during a running phase of the transfer mechanism.
Figure 2:
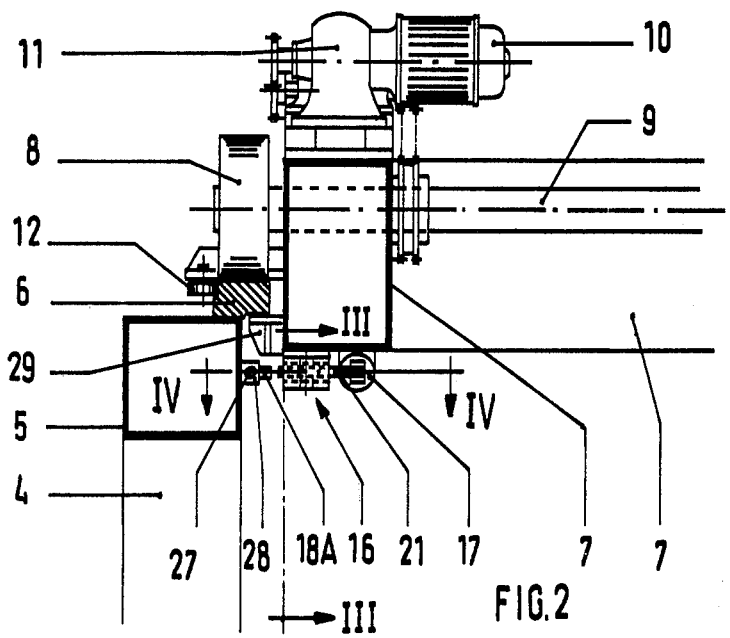
FIG. 2 illustrates a detail of the truck, to which a portion of the centering device of the invention is applied, as viewed according to plane II—II of FIG. 1.

With reference to FIGS. 1 and 2, the aforesaid curing press has as previously discussed, a bed 1, fastened to the ground, and a plate 2 vertically movable with respect to the bed by means of an operating mechanism 3.

The components of the tire curing mold, which can be either of the two-half type or of the sector type without any difference, are set up coaxially on the bed and the plate.

In the first case the mold, as is well known, consists of two parts only, symmetrical with respect to the equatorial plane, each one corresponding to a sidewall of the carcass and the adjacent part of tread; such parts, which we shall simply call lower cheek and upper cheek, are set up on the press integral with the bed and the plate respectively.

In the case of the sector mold, which is also well known, the cheeks only correspond to the sidewalls of the carcass, while a third part consisting of a ring of radically movable sectors corresponding to the tread band is connected with one of the cheeks.

In the sector mold case, the method of assembling the cheeks on the bed and plate is different, since the radial movement of the sectors is usefully generated by the relative axial movement between plate and bed with standstill cheeks, which requires the possibility of relative movement at least between one cheek and the corresponding part of the press, which is well known in the art. In particular, the press of FIG. 1 is equipped with a sector mold of the type described in Italian Pat. No. 944.055 and U.S. Pat. No. 3,922,122.

Furthermore, the press comprises a locking device for the beads of the carcass, coaxial to the upper cheek and axially movable with respect ot the well-known "chuck" which is used for extracting the cured tire from the lower part of the mold, for locking the tire during the movement of the transfer and for unloading the tire from the residual part of the mold.

Integral with the bed of the press is a standing frame which consists of pillars 4 supporting two beams 5, to each of which is fastened a structural shape 6 having carefully machined surfaces which forms one of the guide rails of the transfer mechanism.

The above mentioned truck consists of essentially of a quadrangular frame of beams 7 welded together, which is supported by wheels 8 resting on structural shapes 6 which supports the weight of the transfer while guiding its run in the direction of arrow F and, of course, in the opposite direction.

In the case of FIG. 1, a first pair of wheels are set up to rotate on the frame while a second pair of wheels are interconnected by a shaft 9 and form the driving wheels of the truck. Shaft 9 is connected with a motor reduction gear 10, through a brake-clutch group 11, both of which are fastened to frame 7.

Additional wheels 12 are set up on frame 7 to rest on the side surfaces of the structural shapes 6 to prevent the truck from moving crosswise while maintaining and helping in the smoothness of the truck movement. All the control and safety devices (limit switch 13, abutting surfaces 29, consent switch, etc.) with which the truck is usually equipped are also supplied.

A mechanism 3 for operating the plate and the parts of the mold connected with it, and a mechanism 14 for operating pliers 15 along a vertical axis, suitable for seizing a carcass C along one of its beads, are fastened to the frame and aligned lengthwise, i.e., parallel to structural shapes 6 at a predetermined mutual spacing.

In the lower part of two beams 7, which are adjacent beams 5, are two vises 16 fastened one to each beam, each vise forms a part of the device of the invention, whose structure and running are controlled by an operating cylinder 17 for each vise, which is described below. Each vise cooperates with a tooth (with 18A and 18B alternately), integral with beam 5 on the surface facing the vise. Lastly, two additional devices are provided on each side of the press in a longitudinal direction, one is an apparatus 19 for supporting tire carcasses in a centered position with respect to the axis of pliers 15 when plate 2 is centered on bed 1, and a second is a roller inclined table 20, fastened to the frame, for picking up and removing a cured tire P which has been dropped by the aforesaid chuck, when pliers 15 are centered on the lower cheek of the mold.

It should be apparent that the vulcanizing unit described can include two mold stations which are on opposite sides of the crosswise. In this case, two pliers 15 and two roller tables 20 are provided for.

The running of the transfer mechanism will be further understood from FIG. 1 which shows the transfer mechanism just before the beginning of the working run. With respect to the bed, the plate is lifted together with the upper cheek of the mold and cured tire P, which is held in place by the chuck. Pliers 15 are also lifted to pick up a raw carcass C which has to be cured from apparatus 19.

The centering device (FIGS. 3 and 4) will now be discussed in detail. It consists of two coplanar levers 21 and 22, pivoted orthogonal to the plane between two parallel plates 23 and 24, integrally connected with each other and with the truck. The feet of pins 25 extend above the lever housing. In the zone where they are pivoted, the levers are provided with a toothed curvilinear profile through which they are mutually connected for rotation in such a way that the symmetry plane of the vise, orthogonal to the plane of the above levers, is also orthogonal to the plane containing the axes of pliers 15 and of the mold.

Furthermore, each lever contains one end profiled to a suitable shape with each lever's profiled ends turned to the same side with respect to the plane containing the above mentioned axes such that the profiled ends of the levers form two cheeks of vise 16. The other ends of one lever (21 in the illustrated case) is connected with the end of stem or rod 16 of a double acting operating cylinder 17, which is connected with the truck. The reciprocal motion of the above cylinder makes the pair of levers 21, 22 rotate in such a way as to determine the opening and closing of the vise.

Figure 3:
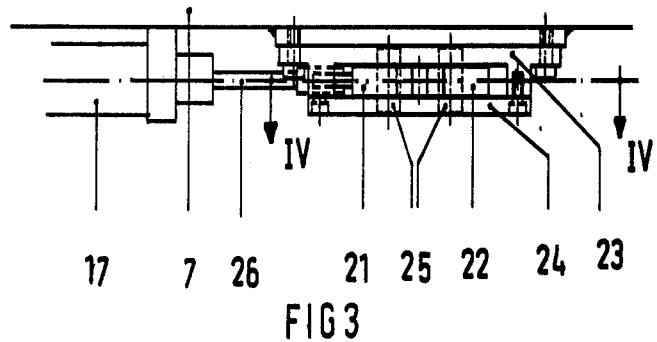
FIG. 3 illustrates the assembly of a portion of the centering device of the invention on the truck, as viewed according to plane III—III of FIG. 2.
Figure 4:
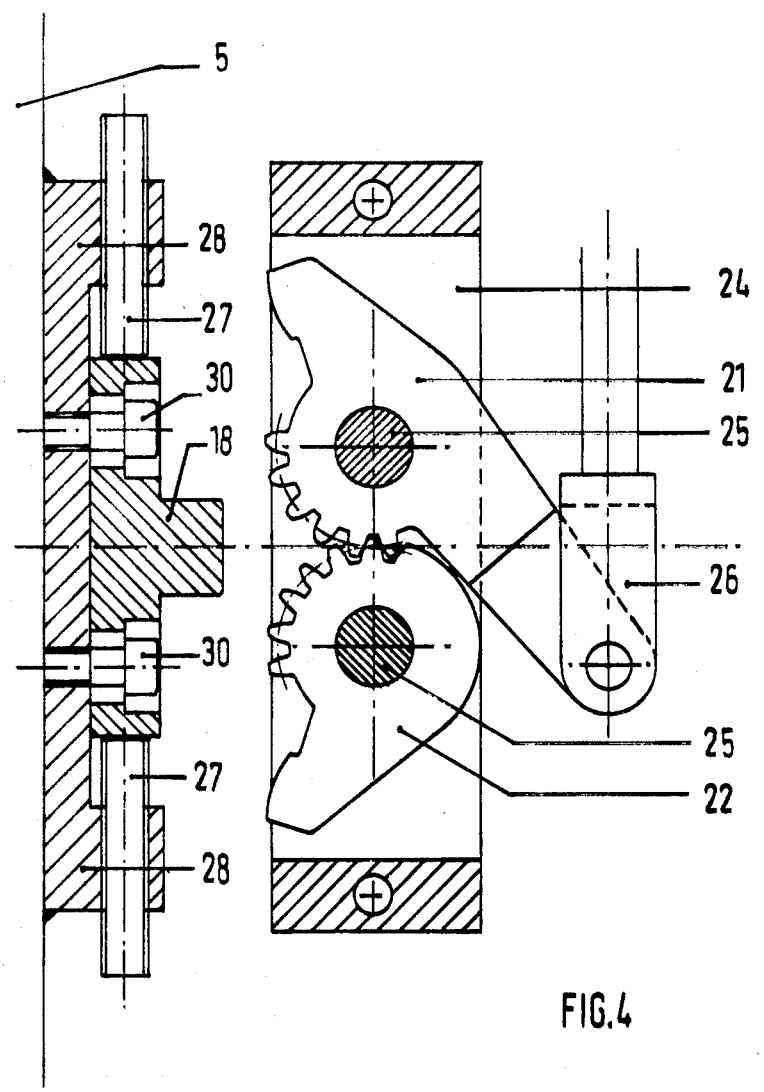
FIG. 4 illustrates the centering device of the invention in a rest position in a cut-away view according to plane IV—IV of FIG. 2.

Of course, during the rotation of the levers, the symmetry plane of the vise is fixed with respect to the truck and, in fact, plate 23 is integrally connected with beam 7 (FIG. 3).

Figure 5:
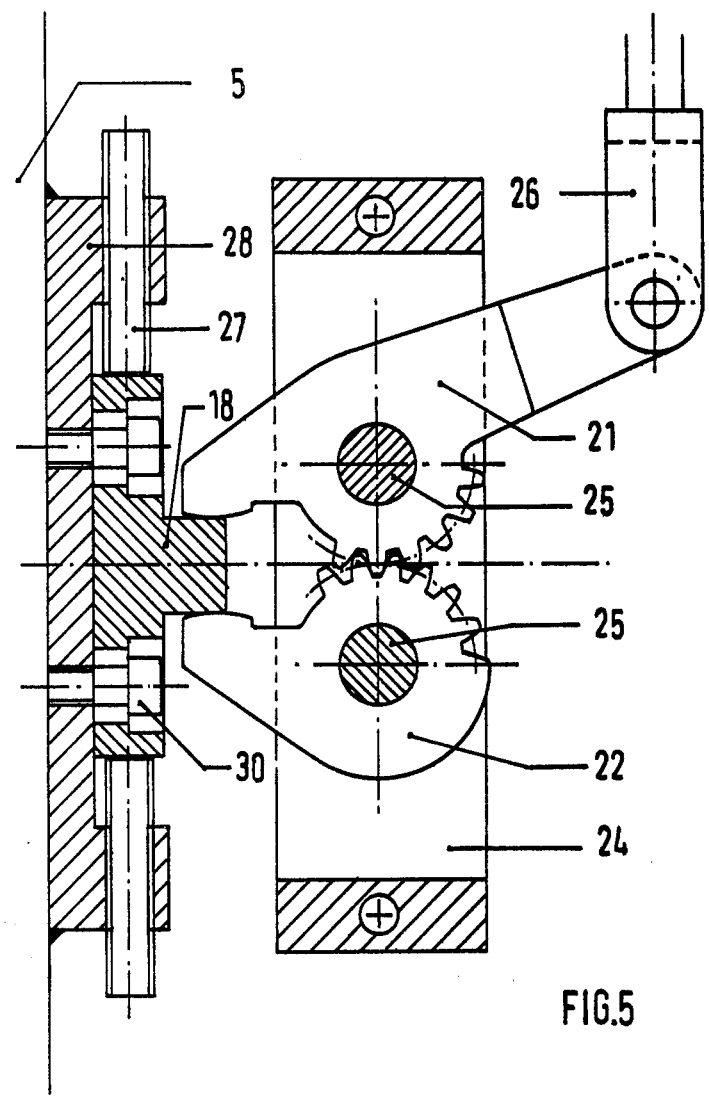
FIG. 5 illustrates the centering device of the invention illustrated in FIG. 4, but in a working position.

The above symmetry plane, with the closed vise over tooth 18 (FIG. 5), coincides with the center line plane of the said tooth. The tooth 18 mates with the vise and is integral with the frame, and correspondingly with the bed of the press. It should be clear that, whenever the above symmetry plane coincides with the above central line plane, i.e., whenever vise 16 closes over a tooth 18, a predetermined unchangeable positioning of the transfer mechanism with respect to the bed is assured.

Therefore, it is enough to solidly fix the positions of the tooth and vise on their respective supporting structures once and for all, in order to be assured of the constancy of the above positioning operation in every operating cycle.

When utilizing the invention described, teeth 18 are constrained to their supporting beam 5, so that their vertical center line plane is also orthogonal to the plane containing the axes of pliers 15 and of the mold, through screw means 27 and nut screw 28. These elements allow an adjustment of the relative positions of the centered mechanisms within some interval, thereby providing a possibility for correcting device assembly mistakes. After adjustment, a final tooth position is then locked in place with other well known means, for instance, with other screw means 30.

As can be seen in FIG. 1, for each beam 5 two teeth, 18A and 18B, are provided thereby assuring two different centering positions of the lower cheek of the mold with respect to the upper check (18A) and pliers 15 (18B) respectively.

The running of the centering device constructed according to the invention will now be discussed. As noted, FIG. 1 shows the transfer mechanism after the working cycle has begun, i.e., with pliers and plate lifted together with their respective coverings. At this point vise 16, previously closed over tooth 18A, is opened by appropriately operating cylinder 17, thus releasing the truck from the frame.

It is to be noted that levers 21 and 22 (FIG. 4) in open position, do not substantially protrude beyond the outline of plates 23 and 24 in correspondence with beam 5. Of course, this is not a necessary condition for the device; the important fact for its operating being that the plane tangent to the above jaws, in open position and orthogonal to them, does not interfer with the tooth, but is at the most tangent thereto.

Upon release of the tooth by the vise, the truck now freely moves in the direction of arrow F, by means of motor 10, unitl tooth 18B is in any position included in the space between the two projecting ends of levers 21 and 22, i.e., inside the open jaws of the vise. When the truck reaches this position it is then stopped by action of the brake of the brake clutch group 11 and as soon as the truck is at a standstill by means of the friction of group 11, shaft 9 of motor 10 is released and cylinder 17 is operated in the opposite direction, thus closing the vise again.

It is evident that, no sooner than one of the two jaws comes into contact with tooth 18, it transmits the thrust received from the stem of cylinder 17 through lever 21 to the tooth 18 coupled to that jaw and, therefore, by reaction with the fixed tooth 18, it transmits an equal and opposite thrust to its pin 25 and, through plate 23, to the truck which is idle over structural shapes 6, thereby moving the truck until the symmetry plane of the vise coincides with the center line plane of the tooth, i.e., until the required centering position is reached.

In this position the jaws coupled to levers 21 and 22 transmit thrusts of equal value and opposite direction to the tooth 18 and, therefore, no stress, which would move it from the centering position, acts on the truck and the tooth 18 is compressed, i.e., firmly held between the above jaws. This compression of tooth 18 now prevents the truck from making any movement, even small, with respect to the frame.

At this point, while the chuck is unloading the cured tire on the conveying device below, pliers 15 moves down and places the raw carcass on the lower cheek of the mold in an exactly centered position. After lifting the pliers, closing the clutch, releasing the brake and opening the vise, the truck now moves in the opposite direction to align with tooth 18A and the same operations are carried out as previously described, thereby obtaining the exact centering of the two cheeks of the mold, after which the plate is lowered for as long as the mold is completely closed in order to start a new curing cycle, while pliers 15 are also lowered for as long as needed to seize the new raw carcass which has meanwhile been put by the operator on frame 19.

With respect to the accuracy achieved in centerings carried out with the above described apparatus, the measurements made on a prototype of the described machine have shown errors on the order of one tenth of a millimeter, which is 100 times smaller than can be achieved by presently used centering methods.

Although the invention has been described with the vise fastened to the truck and the tooth to the frame, the opposite arrangement can also be used. We have therefore explained how the required centering is carried out through two subsequent positionings of the truck with respect to a fiducial tooth. As seen, the first of those positionings can also be very approximate, owing to the width of the vise with open jaws.

In the described apparatus, the usual truck control mechanisms have been left, since they exhibit a poor precision of positioning, even if better than that of the present invention's operating group. They also retain the different drawbacks previously criticized and which are inherent in their structures, particularly with respect to the clearance between the components and the progressive wearing of the same.

In place of the usual operating mechanism of the truck, the above described mechanism with motor reduction gearing brake and its associated friction could be used to stop the truck because its lack of positioning precision with respect to the aforesaid devices is of no importance, since the vise is entrusted with the second precision positioning operation.

As a compensation to replacing the usual truck control with the aforesaid braking, the truck now essentially moves at a constant speed, without rough accelerations and decelerations; also, because the second precision positioning is of limited amplitude and the truck does not automatically move but is dragged from a standstill position with the motor still connected, time is saved in the operating cycle and lower stresses are encountered, as compared with those in known transfer mechanisms, resulting in obvious consequent economic advantages.

The use of the friction in the operating mechanism of the truck acts as a safety device for the installation and the personnel using it, should the transfer mechanism bump against the limit switches (13) at the two ends of the frame without the motor disengaging due to a possible breakdown of the brake or the consent switches.

The device of the invention is not to be confused with known transfer devices which are positioned by means of fixed contrast surfaces (29) abuting on teeth (not illustrated) suitably arranged on the frame; on the contrary, the present invention contains advantages not achievable by these known devices. For example, in the case of the above noted transfer devices movement is restricted to the space between the two teeth which determine the centering of the bed with the pliers or with the plate respectively, unless the above teeth or contrast surfaces are demounted or made movable, which would result in a corresponding increase in the lack of centering precision. On the contrary, with the device according to the invention, the transfer mechanism can move beyond the space between the teeth by moving it with an open vise position in one of the two possible directions for completely removing it from the bed as for instance by bringing it against limit switch 13 with contact surface 29, thus making the bed completely accessible with regard to the operations of mold replacement and maintenance, which are facilitated thereby saving time.

Of course, although the invention has been specifically illustrated as part of a tire curing installation, the concepts and structures employed can easily be applied to any other installation which possesses the same centering problems. Thus, the foregoing description is to be considered as purely exemplary and not limiting, the scope of the invention being defined by the appended claims; and, all changes which come within the meaning and range of equivalency of the claims are therefore included.

I claim:

1. An operating press mechanism comprising:
   a mold including a first portion fixed to a support device and a second portion adapted to mate with said first portion,
   a frame attached to said support device,
   a truck movable horizontally on said frame,
   a first means coupling said second mold portion to said truck,
   means for imparting relative vertical movement between said first and second mold portions for opening and closing said mold,
   vise means including a pair of jaws adapted to open and close attached to one of said frame and said truck at a first predetermined position,
   a first tooth attached to the other of said frame and said truck at a second predetermined position for engaging with said vise when closed between said jaws, said first and second predetermined positions defining a desired alignment between said first and second portions of said mold obtained when said jaws are closed about said tooth,
   means for controlling a coarse movement of said truck on said frame to cause a first approximate mutual alignment of said vise and said first tooth, and means for controlling a precise alignment of said first and second portions of said mold, said means for controlling a precise alignment including means for closing said jaws about said first tooth to thereby impart relative movement between said truck and said frame thereby causing said desired alignment between said first and second portions of said mold.

2. An operating press mechanism as in claim 1 wherein said support device, said first portion of said mold and said frame are stationary, and said means for imparting vertical movement is integral with said first means coupling said second mold portion to said truck.

3. An operating press mechanism as in claim 2 further comprising:
lifting means for placing articles in said mold, said lifting means being coupled to said truck at a point removed from said second portion of said mold and including means for grasping articles, and
means for imparting vertical movement to said lifting means and for controlling the opening and closing movements of said means for grasping articles.

4. An operating press mechanism as in claim 3 further comprising:
means for centering said lifting means with respect to said first portion of said mold, said means for centering including said vise means and a second tooth attached to said other of said frame and said truck at a third predetermined position for engaging with said vise means between said jaws, said first and third predetermined positions defining a desired alignment between said lifting means and said first portion of said mold obtained when said jaws are closed about said second tooth, said means for controlling movement of said truck on said frame being operative to cause a first approximate mutual alignment of said vise means with said second tooth, and said means for controlling a precise alignment also being operative to control a precise alignment of said lifting means with said first portion of said mold by closing said jaws about said second tooth to thereby impart relative movement between said truck and said frame causing said desired alignment between said lifting means and said first portion of said mold.

5. An operating press mechanism as in claim 4 wherein said vise means comprise:
a lever housing,
a pair of coplanar levers each rotating about a respective pin and having a curvilinear profile containing a toothed surface for mating with the other lever for mutual rotation, each lever having an end portion forming one of the jaws of said vise means, both lever end portions adapted to project from the same side of said lever housing for engaging with said first or second tooth, one of said levers being coupled to said means for controlling a precise alignment.

6. An operating press mechanism as in claim 5 wherein said means for controlling a precise alignment comprises a double acting cylinder which includes a stem portion coupled to one of said levers, said double acting cylinder opening said jaws of said vise when said stem is in a first position and closing said jaws about one of said first or second tooth when said stem is in a second position.

7. An operating press as in claim 6 wherein said means for controlling a precise alignment further comprises means for applying thrusting force to said stem portion of said cylinder when said means for controlling a precise alignment causes a closure of said jaws.

8. An operating press as in claim 7 wherein said vise means is fixed to said truck and said first and said second tooth is fixed to said frame.

9. An operating press mechanism for tire vulcanizing molds comprising:
two apparatus relatively movable orthogonal to a prefixed axis, one of the said apparatus consisting of a press, the other apparatus consisting of a transfer mechanism, which can be moved on said press orthogonal to the axis of a curing mold set up on said press, forming the above prefixed axis, for the contemporaneous unloading of the cured tire and the loading of the raw carcass to be cured, said press comprising:
a curing mold;
a bed fastened to a support means on which the lower part of the curing mold is set up, with a vertical axis;
a plate vertically movable with respect to said bed, to which the upper part of the curing mold is attached, vertical movement of said plate with respect to said bed causing the alternate opening and closing of said mold; and,
a frame integral with said bed;
said transfer mechanism comprising:
a seizing pliers for engaging with and lifting tire carcasses;
a truck, movable horizontally on said frame in a prefixed direction;
a first means, integral with the said truck, for vertically operating said plate and said upper part of said mold;
a second means, integral with the said truck in a position aligned with the said first means parallel to the direction of movement of the truck for vertically operating said seizing pliers, said second means having a vertical axis;
means for controlling the movement of the truck on said frame for a first approximate mutual alignment of said transfer mechanism with said press, according to a common prefixed axis;
said press further comprising:
a centering device for controlling a second precision alignment between the said transfer mechanism and said press according to the above common prefixed axis and for locking the said transfer mechanism on said press in a centered position; said centering device comprising:
a mechanical fiducial tooth element, integral with either said transfer mechanism or said press, in a first prefixed position;
a vise means integral with the other of said transfer mechanism or said press in a second prefixed position for seizing said tooth, said tooth and vise being able to mutually mate when at least approximate alignment of said transfer mechanism with said press is attained, according to the said common prefixed axis, said tooth and vise, when mutually mated, forming a locking constraint between said transfer mechanism and press, and said vise comprising:
a bearing plate, integral with the other of said transfer mechanism or said press,
two levers coplanar to each other in a plane parallel to the lying plane of said bearing plate, each other rotating around a pin which extends out of said bearing plate orthogonally, each one having a curvilinear proflie and containing a toothed portion in the zone between said pins, said levers being mutually coupled for rotation by means of said tooth portions, each lever having a profile forming one of the jaws of said vise on one of its ends, said ends being arranged on the same side with respect to the plane containing the axes of said pins, said mutual rotation of said levers producing the opening and closing of said vise, the symmetry plane of said vise being arranged orthogonal to said plane containing the pin axes and to the lying plane of the said levers; and, means for producing said mutual rotation of the levers between respective open vise and closed vise positions, corresponding to an interdistance between the said jaws of maximum and minimum value respectively, the said maximum value being not less than that which is necessary to allow said jaws to clear said tooth element during relative movement between said transfer mechanism and said press.

10. An operating press mechanism as in claim 9, wherein said minimum value of the distance between said jaws in the limit position of closed vise is less than the width of said tooth element in the direction of the movements of the said truck with respect to the said frame.

11. An operating press mechanism as in claim 10, further comprising means for providing thrusts in conjunction with said rotation of said jaws during the closing rotation of said vise.

12. An operating press mechanism as in claim 11, wherein said means for producing said mutual rotation of said levers is also adapted to apply said thrusts, and wherein said means for producing said mutual rotation comprises double-acting cylinder, attached to the other of said transfer mechanism or press and having a stem which is connected with one end of one of said levers.

13. An operating press mechanism as in claim 12, wherein two identical centering devices for the precision alignment between said transfer mechanism and said press are symmetrically arranged with respect to the vertical plane containing the axes of the said mold and said pliers, the vises of said two identical centering devices being integral with the said truck, and the teeth of said two identical centering devices being integral with said frame.

14. An operating press mechanism as in claim 12, wherein two common prefixed axes of alignment between said transfer mechanism and said press are provided for, one made by the coaxial alignment of said upper part of said mold with said lower part of the mold, and the other made by the coaxial alignment of said seizing pliers with said lower part of the mold, and wherein a tooth adapted to couple with said vise is supplied on said frame for each axis.

15. An operating press mechanism as in claim 1, wherein said means for controlling the movement of said truck on said frame consists of at least a pair of driving wheels for said truck connected with an operating motor through a brake-clutch device which is adapted to stop the movement of the motor and to disconnect said driving wheels from said operating motor.

16. An operating press mechanism as in claim 15, wherein means are provided for preventing said vise means from closing or opening when said driving wheels are connected with said operating motor.

* * * * *